US008892792B2

(12) United States Patent  
Royster et al.

(10) Patent No.: US 8,892,792 B2  
(45) Date of Patent: Nov. 18, 2014

(54) DISTRIBUTED MEDIA SYSTEM

(75) Inventors: Howard Isham Royster, Lafayette, CA (US); Michael J. Rogerson, Irvine, CA (US); Benjamin Alexander Medvitz, Irvine, CA (US)

(73) Assignee: Intheairnet, LLC, Irvine, CA (US)

( * ) Notice: Subject to any disclaimer, the term of this patent is extended or adjusted under 35 U.S.C. 154(b) by 115 days.

(21) Appl. No.: 13/230,675

(22) Filed: Sep. 12, 2011

(65) Prior Publication Data

US 2013/0063612 A1    Mar. 14, 2013

(51) Int. Cl.

| | | |
|---|---|---|
| G06F 3/00 | (2006.01) | |
| H04N 7/18 | (2006.01) | |
| H04N 21/81 | (2011.01) | |
| H04N 21/4363 | (2011.01) | |
| B64D 11/00 | (2006.01) | |
| H04N 21/214 | (2011.01) | |
| B64D 11/06 | (2006.01) | |

(52) U.S. Cl.  
CPC ..... *H04N 21/43632* (2013.01); *H04N 21/8193* (2013.01); *B64D 2011/0637* (2013.01); *B64D 11/0015* (2013.01); *H04N 21/2146* (2013.01)  
USPC ............................................. 710/36; 725/77

(58) Field of Classification Search  
None  
See application file for complete search history.

(56) References Cited

U.S. PATENT DOCUMENTS

| | | | | |
|---|---|---|---|---|
| 6,058,288 | A * | 5/2000 | Reed et al. | 455/3.06 |
| 8,085,139 | B2 * | 12/2011 | Kanevsky et al. | 340/436 |
| 2003/0217363 | A1 * | 11/2003 | Brady et al. | 725/76 |
| 2006/0174285 | A1 * | 8/2006 | Brady et al. | 725/76 |
| 2009/0083805 | A1 | 3/2009 | Sizelove et al. | |
| 2012/0081207 | A1 * | 4/2012 | Toprani et al. | 340/4.3 |
| 2013/0063340 | A1 * | 3/2013 | Mondragon et al. | 345/156 |

* cited by examiner

*Primary Examiner* — Farley Abad  
*Assistant Examiner* — Richard B Franklin  
(74) *Attorney, Agent, or Firm* — McKenna Long & Aldridge LLP

(57) ABSTRACT

An in-flight system provides a user with an entertainment environment including movies, music, games, internet, map, etc. The in-flight system provides stored media content on one or more servers located throughout an aircraft cabin and each server is associated with a plurality of seats. In a preferred embodiment, the in-flight system provides for a communication port (e.g., USB or mini-USB connector or micro-USB connector) for connection to personal electronic device providing access to the server containing the stored media, access to an internet connection, and power. In one embodiment, the in-flight system provides for a seat display unit (typically located in the seat back of the next forward seat) and associated media module hardware to process the stored media content and drive the display. In one embodiment, the in-flight system comprises an isolation module or equivalent circuitry or logic that can isolate the media module and/or the personal electronic device from the remainder of the in-flight system, allowing for updates to the in-flight system without recertification from the FAA.

22 Claims, 9 Drawing Sheets

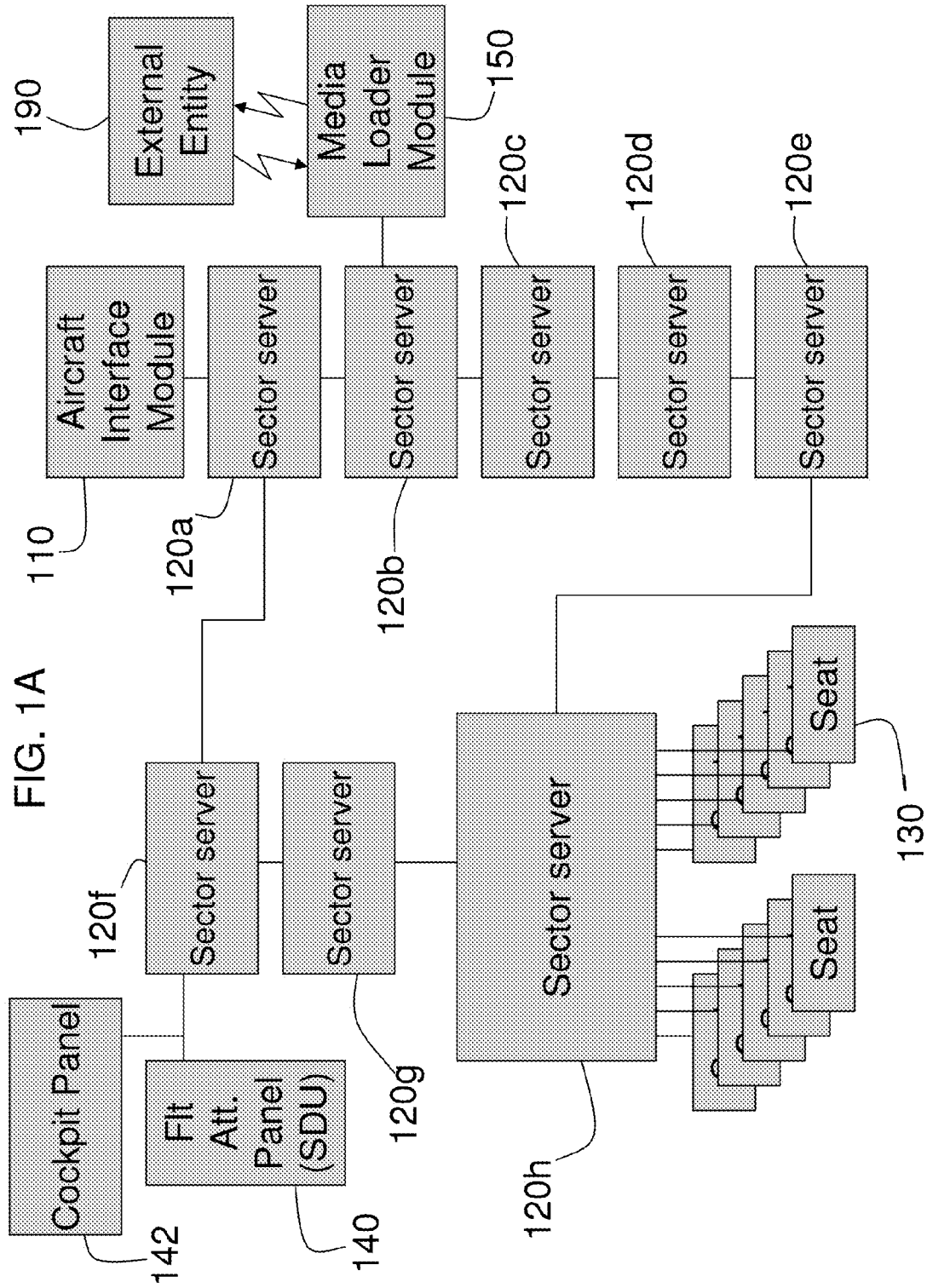

DISTRIBUTED MEDIA SYSTEM

FIELD OF THE DISCLOSURE

This application relates generally to in-flight systems.

BACKGROUND OF THE DISCLOSURE

An in-flight system provides for audio and video contents to a passenger during flight. The in-flight system becomes increasing important during long flights where passengers may associate a quality of service of the airline based on the enhanced experience they obtained with the in-flight system. To accommodate the passengers, airlines resort to providing enhanced features to the in-flight system. However, known in-flight systems are usually in-seat computers connected to a seat back display. The in-seat computers are heavy and costly to maintain. Also, because of the enhanced features that the in-seat computers have to run, heat generated by the in-seat computers is a source of problems. Further, each in-seat computer is connected to a central server with long cable lines. This configuration has potential safety and fire hazard issues.

Cost of an in-flight system is a major issue for the airlines. While passengers demand for enhanced features in an in-flight system, they are not willing to pay a premium for the services. Thus, in most instances, the enhanced features and the in-flight system add to the operating costs of the airlines. Furthermore, in-flight systems may require routine upgrades in order to keep current with the technology. However, known in-flight systems are intertwined with the public announcement and video announcement system of the airline personnel, such that any upgrade of the in-flight system may require the whole in-flight system to be recertified by the Federal Aviation Administration (FAA). Recertifications are costly, time consuming and burdensome. Many airlines simply resort to not upgrading their in-flight systems at all resulting in operating less than up-to-date in-flight systems.

SUMMARY

An in-flight system provides a user with an entertainment environment including movies, music, games, internet, map, etc. The in-flight system provides stored media content on one or more servers located throughout an aircraft cabin and each server is associated with a plurality of seats. In a preferred embodiment, the in-flight system provides for a communication port (e.g., USB or mini-USB connector or micro-USB connector) for connection to personal electronic device providing access to the server containing the stored media, access to an internet connection, and power. In one embodiment, the in-flight system provides for a seat display unit (typically located in the seat back of the next forward seat) and associated media module hardware to process the stored media content and drive the display. In one embodiment, the in-flight system comprises an isolation module or equivalent circuitry or logic that can isolate the media module and/or the personal electronic device from the remainder of the in-flight system, allowing for updates to the in-flight system without recertification from the FAA.

BRIEF DESCRIPTION OF THE DRAWINGS

FIG. 1A illustrates an exemplary in-flight system according to one embodiment of the invention.

DETAILED DESCRIPTION

FIG. 1A illustrates an exemplary in-flight system according to one embodiment of the invention. The in-flight system may include one or more sector servers 120a-h serving a plurality of seats 130. In the embodiment of FIG. 1A, several sector servers 120a-h are installed throughout an aircraft. However, it is conceivable that the in-flight system may be used in any large vehicle such as a bus or a ship. Each sector server 120 serves a plurality of seats 130 in its vicinity, in this embodiment, up to ten seats. However, generally, the number of seats that the sector server 120 may serve may depend on the processing power of the sector server 120. A seat 130, usually, a back of the seat, may include a seat display unit (SDU) that provides for a user to have access to the sector server and also, for the sector server 120 to provide information to the user. The SDU may be connected to one associated sector server 120 via an electrical connection such as, for example, Ethernet, Universal Serial Bus (USB), and the like.

Figure 1B:
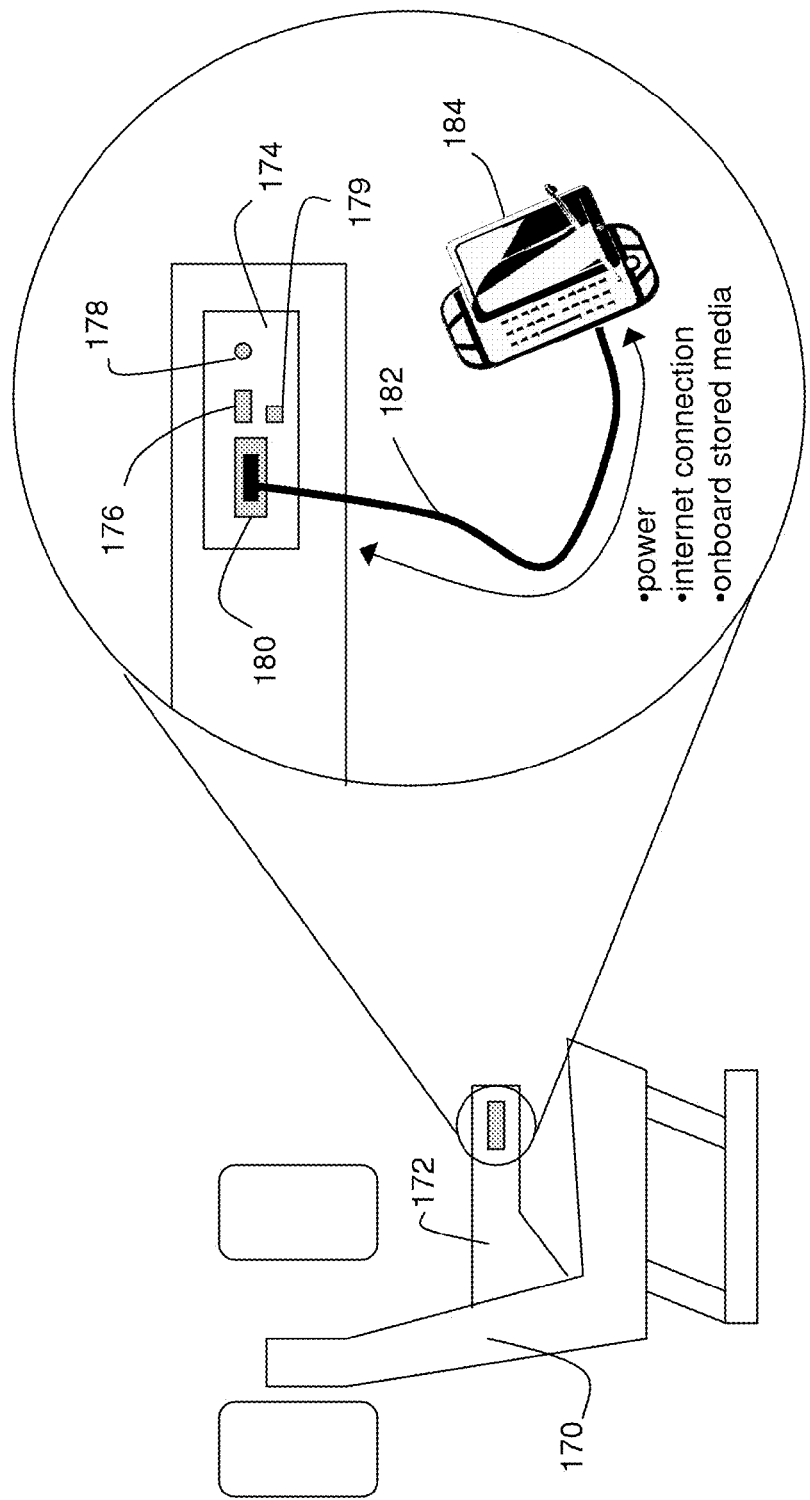
FIG. 1B illustrates an exemplary user interface according to one embodiment of the invention.

In one embodiment, as seen in FIG. 1B, a seat 170 may or may not be provided with a SDU, but instead of or in addition to, would have a user interface 174. In FIG. 1B, a user interface 174 includes at least one communication port 176, 178, 179, or 180 (e.g., connectors for USB 180, mini-USB 176, micro-USB 179, and/or bi-directional headphones 178) that provides for a user to connect, via a wired connection 182 the user's personal electronic device (PED) 184 with the sector server; the wired connection 182 providing power, an internet connection, and/or access to onboard stored media. Examples of PEDs are laptop computers, Blackberries, iphones, ipads, tablets, smart phones, cellular phones, and the like.

In the embodiment where the PEDs 184 are physically connected to the user interface 174, a USB connection (e.g., 180 or 176) may be preferred since the USB connection provides power to the PED as well as charge the PED's battery, if necessary. In the wired connection, an in-arm 172 user interface 174 comprises USB 180 and/or mini-USB 176 and/or micro-USB 179 connections. In one embodiment, the user interface 174 is located in the seat arm 172. In another embodiment, the user interface 174 is located in a side wall. In another embodiment, the user interface 174 is located in the seat back where a SDU is located or could be located. The USB connection allows the in-flight system to supply power to PEDs so that said devices can be fully utilized during flight, but leave the aircraft fully charged.

The in-flight system wired connection 182 solution illustrated in FIG. 1B, provides a number of features and advantages to the user. First it provides an accessible internet connection with the in-flight system if internet connection is available. Second, it provides access to stored onboard media. And it provides a power connection to the PED 184, which in addition to powering the operation of the PED 184, also recharges the PED's batteries. As can be seen by the presently prolific use of in airport recharge towers, the advantage of being able to power the PED while onboard is huge. Users of PEDs no longer need to wait in line at the station chargers before boarding an aircraft. This feature has remained unavailable, causing dead PEDs before or after flights, particularly on long flights. Likewise, the ability to use your own PED 184, whether for personal tasks, or to access the in-flight system, provides flexibility and access that have not been previously available to in-flight systems with SDUs. And, even if a user chooses not to use the in-flight system, the user interface 174, and more specifically USB connector 176, 179, or 180, still would allow the user to recharge their PED 184.

In an alternative embodiment, the PED may be wirelessly connected to the sector server, for example, using a wireless communication device compatible with the wireless communication component of the PED. In one embodiment, the in-flight system is configured to connect wirelessly to a user PED when they enter the aircraft and if the necessary application software is not available on the PED, the in-flight system may offer to push the application software, so that when the user connects at their seat, their PED comprises the necessary software to access the in-flight system. In one embodiment, when the user connects their PED to the in-flight system, only the specific application software may be used on the PED, and all other functions/applications are disabled. Exemplary features of the PED seat connectors are that they provide power, an internet connection pipe, and access to stored media content.

Each sector server 120 is connected to one another in order to communicate with each other and/or also to share media, information, and data with each other. In this embodiment, the sector servers 120*a-h* are serially connected in a daisy chain, however, in an alternative embodiment, the sector servers 120*a-h* may be connected together in parallel. In either embodiment, the plurality of sector servers 120*a-h* are capable of copying (e.g., mirroring) data to any of the other sector servers 120*a-h*. This architecture is distributed, not requiring media storage or management at a head end or in the seat locations. A flight attendant panel 140 or a cockpit panel 142 may be connected to one or more of the sector servers 120*a-h* in the daisy chain. Flight attendant panel 140 or cockpit panel 142 allows for an airline personnel to take control of the in-flight system in order to provide, for example, safety, public, security and other messages and/or announcements. In one embodiment, this means pausing media being played through the in-flight system. In one embodiment, this means stopping the media being played through the in-flight system. The reason for this type of control is FAA regulation that requires that no aircraft controllable system interferes with aircraft personnel communications with users, particularly with regard to safety announcements.

An aircraft interface module 110 may be connected to one or more of the sector servers 120 in the daisy chain to provide, among other things, flight data such as GPS coordinates, speed, altitude, time, temperature, yaw, pitch, and roll values. This data may be used by the sector servers 120*a-h*, for example, in conjunction with a map program at the sector servers 120*a-h*, to provide a user with information regarding the status of the flight. Usually, the communication between aircraft interface module 110 and sector servers 120*a-h* is a one-way communication, that is, aircraft interface module 110 sends flight data and one or more sector servers 120*a-h* receive the flight data. This isolates the sector server 120 from being able to send or write data to the aircraft interface module 110.

In one embodiment, a media loader module 150 may be connected to one or more of the sector servers 120*a-h*. The media loader module 150 may be used to upload and/or download media contents and information to/from the aircraft from/to an external entity 190. For example the media contents may be movie, music, maps, internet, preprogrammed media contents for the aircraft, airline status/transfer information, or any other media contents and information required by the aircraft or a user of the aircraft. External entity 190 may be third party media content providers, the airline, or another aircraft. Alternatively, external entity 190 may be a terrestrial media storage facility for the in-flight system. Media loader module 150 may communicate with the external entity 190 through a wired or wireless communication medium while the aircraft is on the ground, or through a wireless communication medium while the aircraft is taxing or flying at an altitude where wireless communication is possible, or through a satellite at higher altitudes. In one embodiment, media loader module 150 is directly connected to one sector server (e.g., 120*b* in FIG. 1A), and is used to load specialized material (e.g., GUIs, fonts, graphics, etc.) and/or mass media updates from local removable storage that would be more efficiently updated locally than via an external entity 190.

Figure 2:
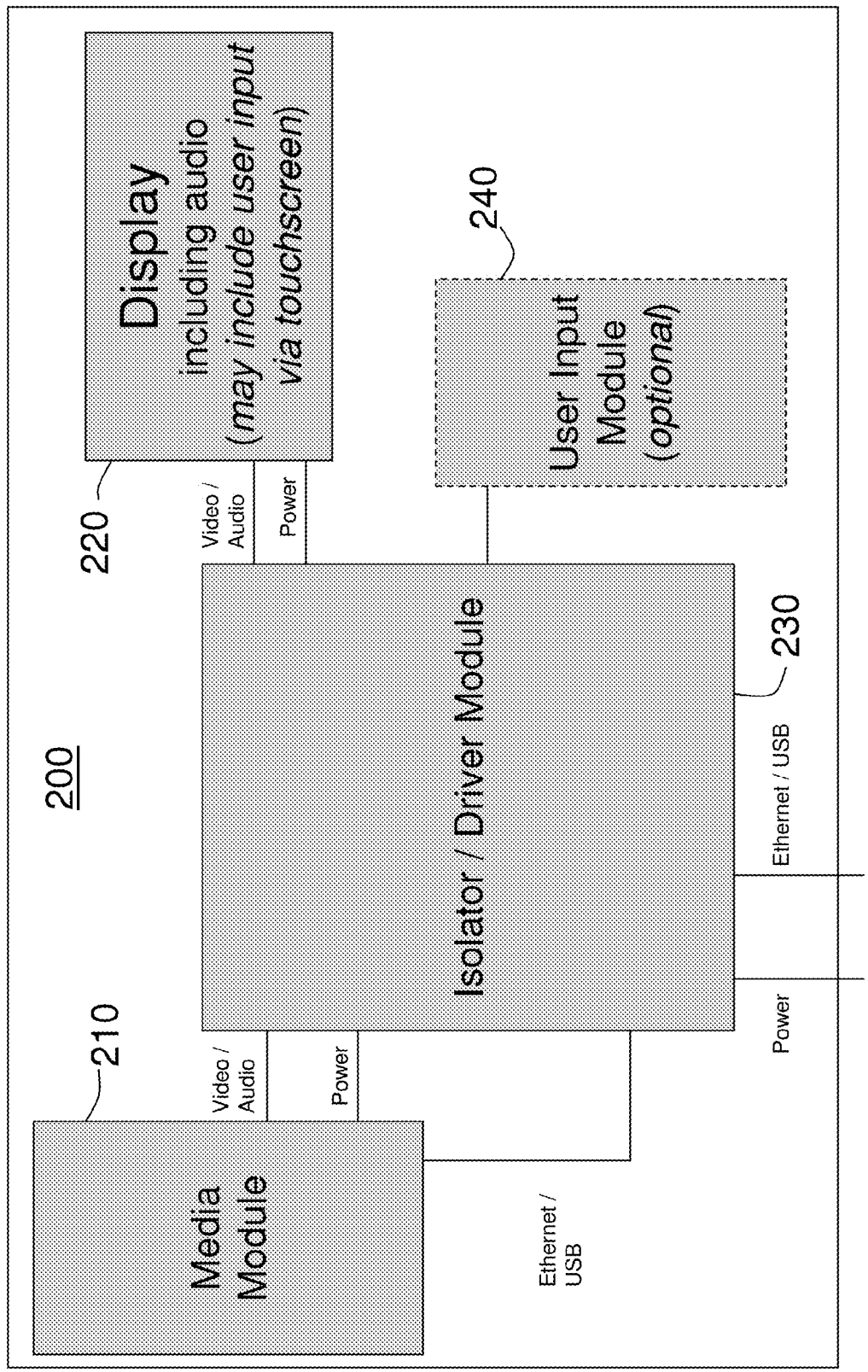
FIG. 2 illustrates an exemplary seat display unit (SDU) that is used in the in-flight system according to one embodiment of the invention.

FIG. 2 illustrates an exemplary seat display unit (SDU) 200 that is used in the in-flight system according to one embodiment of the invention. The SDU 200 comprises a media module 210, a display 220, and an isolator/driver module 230. At the seat, an audio output, for example, headphone jack, and a user input module 240 may be provided to receive user input. In one embodiment, the seat may not include a user input module and the display 220 may be a touchscreen LCD configured to receive user input.

In one embodiment, the media module 210 may be the same or similar to the electronic components that are found in a personal electronic device (PED) that is used to send and receive media contents. The media module 210 may operate under one or more platforms. In this embodiment, the media module 210 at least supports the Google Android™ application programming interface (API) provided by the Android™ platform. The media module 210 may run one or more Android™ applications in order to communicate with the sector server that also runs on a platform, for example the Android™ platform. The application that is written to run on the media module 210 allows the media module 210 to access the media contents through the sector server. The media module 210 may communicate with the sector server through Ethernet and the like. This communication may occur via the network using one or more sockets, ports, etc. In one embodiment, the media module 210 may access stored media content via a USB connection using Android™ android.hardware.usb package. The media module 210 may mount the stored media, which may be stored in different physical storage devices, as a conventional file system in order to access the media contents therein. As understood in the art, media module 210 may comprise one or more device drivers to access the stored media, whether it is by a network or physical storage device. In one embodiment, when the stored media is encrypted, using AES-256 for example, media module 210 also includes the requisite decryption software to the stored media after accessing the contents therein. When the media module 210 is accessing the sector server via a wireless network using, for example, wireless fidelity (Wi-Fi) protocol, the media module 210 may be implemented using Android™ android.net.wifi package to access the sector server. Further information on the Android™ application programming interface (API) and software development kit (SDK) may be found at the Android developers' website.

Whether the media contents requested by the media module 210 are received by the media module 210 is dependent on the mode of the isolator/driver module 230. In the "isolation" mode, the isolator/driver module 230 prevents or halts the media contents from being received by the media module 210. In the "pass" mode, the isolator/driver module 230 allows the requested media contents to be received by the media module 210. Simply stated, the isolator/driver module 230 serves to perform as a pass-through module of data when an aircraft interface interaction is not being performed, and serves to isolate or prevent the display 220 from displaying the media content requested by the user when an aircraft interface interaction is being performed. Examples of the aircraft interface interaction may be an audio and/or video announcement from the airline personnel regarding safety, security, or general announcement. It should be noted, that isolator/driver module 230 or some related circuitry also filters input request from user input module 240 or touchscreen display 220 as will be described in more detail below with reference to finite state machine 600. The same principles may be implement in isolator/driver module 230.

In one embodiment, the isolator/driver module 230 is a finite state machine formed using a Field Programmable Gate Array (FPGA). However, the isolator/driver module 230 need not necessarily be limited to a FPGA and may be formed using an application specific integrated circuit (ASIC), a complex programmable logic device (CPLD) or other suitable integrated circuit devices. In one embodiment, a FPGA available from Xilinx® Inc., located in San Jose, Calif., USA, may be used. As an example, the Virtex-5 series may be used. An example of a finite state machine based on a FPGA may be found in U.S. provisional patent application Ser. No. 61/449,960, filed Mar. 7, 2011, which is incorporated herein be reference in its entirety for all purposes. The isolator/driver module 230 that is configured as a finite state machine transitions to a state in a finite number of states when triggered by an event in the in-flight system. Examples of an event may be when the media module 210 of the SDU 200 indicates that the module is malfunctioning, or when a flight attendant panel or cockpit panel indicates that a public announcement (PA) or a video announcement (VA) is to be made. Simply put, the finite state machine is driven by events.

Figure 3:
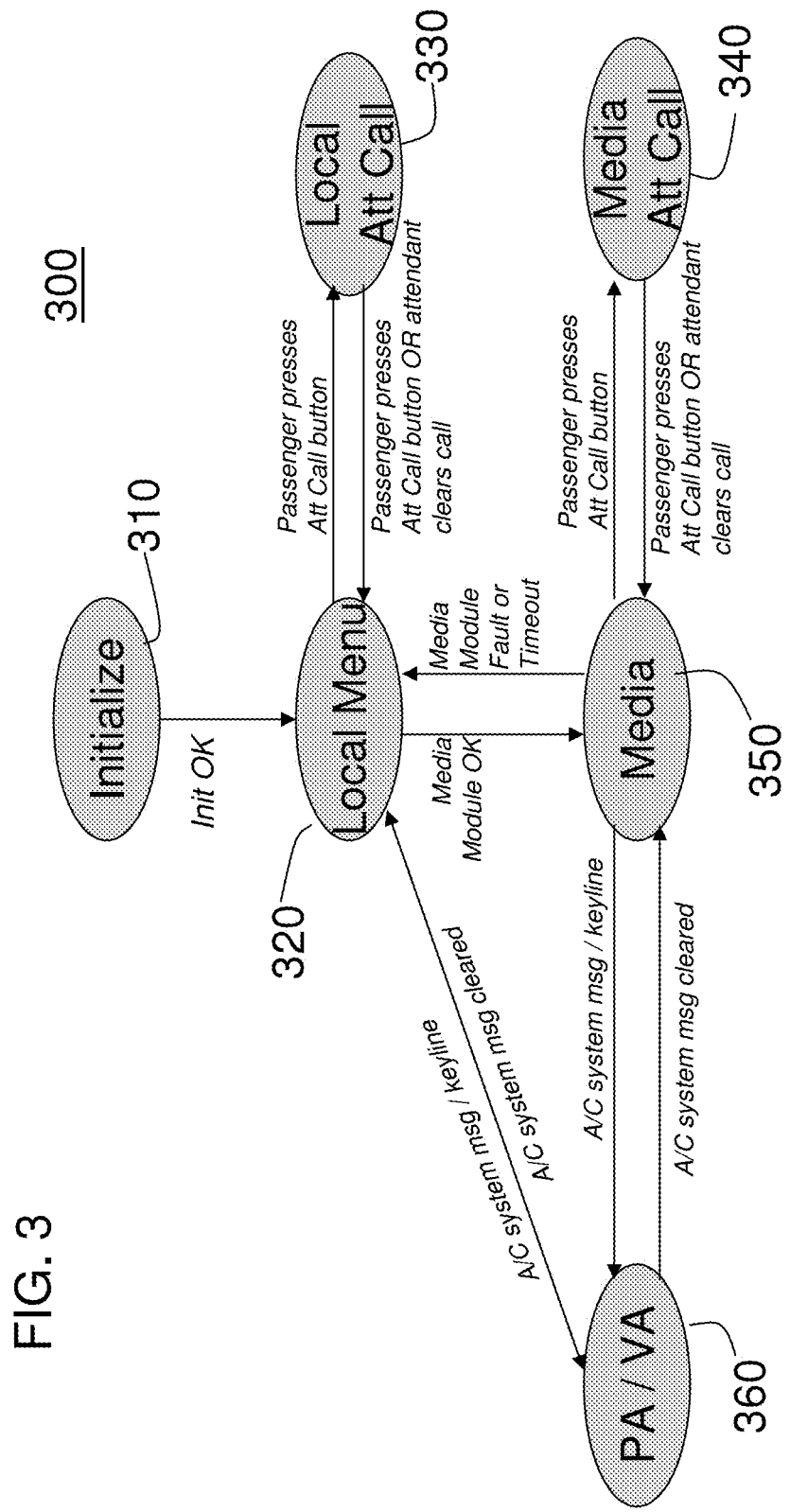
FIG. 3 illustrates an exemplary state diagram of a finite state machine implemented in an exemplary isolator/driver module according to one embodiment of the invention.

FIG. 3 illustrates an exemplary state diagram of the finite state machine implemented in an exemplary isolator/driver module 230 according to one embodiment of the invention. Each event causes the finite state machine to transition from a current state to another state, or in some cases, the finite state machine does not transition to another state but returns to the current state. There are many action types in the finite state machine such as "entry action" where an action is performed when entering a state; and "exit action" where an action is performed when exiting a state. Usually, the finite state machine described above performs entry action. However, the finite state machine need not be limited to this type of action.

Referring to FIG. 3, at state 310, the isolator/driver module 230 initializes to set up and verify its functionality. Once the isolator/driver module 230 verifies that all functions are operating correctly, the state machine transitions to state 320, which is the Local Menu. In this state, the media module 210 outputs are disconnected and the isolator/driver module 230 provides the video and audio data to be displayed in the display 220. Because the media module 210 is disconnected in this state, media module 210 can be updated, such as, for example, an update of the Android™ application.

If the user selects an attendant call from the Local Menu state 320, for example, through the user input module 240 or the touchscreen display, this event would trigger the finite state machine to transition to state 330. At state 330, the isolator/driver module 230 may cause information to be displayed at the display 220 indicating that the attendant call has been activated and/or cause information to be displayed at the flight attendant panel 140 indicating that attendant attention is needed by the user. Here, the isolator/driver module 230 causes video and/or audio information to be generated at the user's display 220 and/or the flight attendant panel 140. In one embodiment, attendant call information is displayed over the local menu of the user's display 220. The finite state machine may transition back to state 320 if the user clears the attendant call or the flight attendant clears the call.

When the user requests media content from the sector server 120 at the Local Menu 320, the isolator/driver module 230 queries the media module 210 for operational status. If the media module 210 signals to the isolator/driver module 230 that it is fully functional, the finite state machine transitions from state 320 to Media, which is state 350. In state 350, the media module 210 is utilized to access the media content from the sector server 120, and the isolator/driver module 230 passes through the media content requested by the user through the media module 210. Therefore, media content such as games, pictures, internet, map, and movies, etc. as requested by the user may be run and displayed at the display 220 through the media module 210. If the media module 210 is malfunctioning (i.e., a fault is detected) or a timeout occurs, the state machine of the isolator/driver module 230 does not transition to state 350, but instead remains at state 320, which means that the media module 210 will not be used in the SDU 200. In one embodiment, the FPGA includes an emergency video and/or audio engine which the isolator/driver module 230 could fall back on, which is capable of accessing data from the sector server and generating video and audio signals to be displayed on the display 220, so that full functionality of the in-flight system at the SDU will not be lost. In that case, isolator/driver module 230 becomes the driver for the media contents and communicates with sector server 120. For example, a system for accomplishing this FPGA driven media presentation along with interaction with a server is disclosed in U.S. provisional patent application Ser. No. 61/449,960, filed Mar. 7, 2001, which is fully incorporated herein by reference in its entirety for all purposes.

When the in-flight system requires isolation from media contents provided by the media module 210 or, in certain instance, provided by the isolator/driver module 230, for example for public safety announcements, the state machine of the isolator/driver module 230 transitions to another state 360, which is PA/VA. In this state, the isolator/driver module 230 stops, pauses, filters, or simply disconnects the flow of data (either media content and/or display data) from being output through a media module 210, or in certain instances, the isolator/driver module 230. As shown in FIG. 3, state 360 may be entered from either the Local Menu (state 320) or the Media (state 350). From either state 320 or state 350, the finite state machine transitions to state 360 triggered by a signal (e.g., keyline or system message) for a public announcement or video announcement regarding safety of the passengers, for example. Once the system message (i.e., PA/VA signal) is cleared, the finite state machine returns to its previous state 320 or state 350. While the isolator/driver module 230 is in PA/VA (state 360), the media module 210 output, or, in certain circumstances, media content outputted by the isolator/driver module 230, is disconnected and the isolator/driver module 230 generates video and/or audio outputs corresponding to the public announcement or video announcement.

While the user is in the Media (state 350) viewing or otherwise accessing media content, they may request an attendant call which may cause the state machine to enter Media Att Call (state 340), which would, for example, display information over media content being viewed. This may be exited by the user again pressing the attendant call button or the flight attendant clearing the call. In state 340, the media module 210 output is not prevented or blocked by the isolator/driver module 230 and the isolator/driver module 230 instead overlays locally generated video (e.g., that an "Attendant has been called") to the media content at the display 220. The transition out of state 340 puts the finite state machine to transition to Media state 350.

In all states of the finite state machine, the isolator/driver module 230 is in control of the output (i.e., video and audio) whether (i) pass-through, (ii) isolate, or (iii) driven. In one embodiment, in all states of the finite state machine, the isolator/driver module 230 may accept user input to turn on the reading light. And each state of the finite state machine is configured to generate system messages for activating the reading light. In one embodiment, every state of the isolator/driver module's 230 finite state machine 300, except the PA/VA state 360, allows the isolator/driver module 230 to generate a system message to activate the reading light. In yet another embodiment, a user request for a reading light requires the state machine 300 to enter either Local Attendant Call state 330 or Media Attendant Call state 340.

Because the media module 210 may be isolated or blocked from having access to media contents from the sector server 120 using the isolator/driver module 230, media module 210 upgrades may be made without requiring the entire in-flight system to be recertified by the Federal Aviation Administration (FAA). This is because isolator/driver module 230 may function to isolate or block the media module 210 and thereby, the media module 210 is isolated or blocked from competing with the public announcements and video announcements made by the airline personnel. Media module 210 may be updated with software/firmware, or even physically replaced, without recertification.

Figure 4:
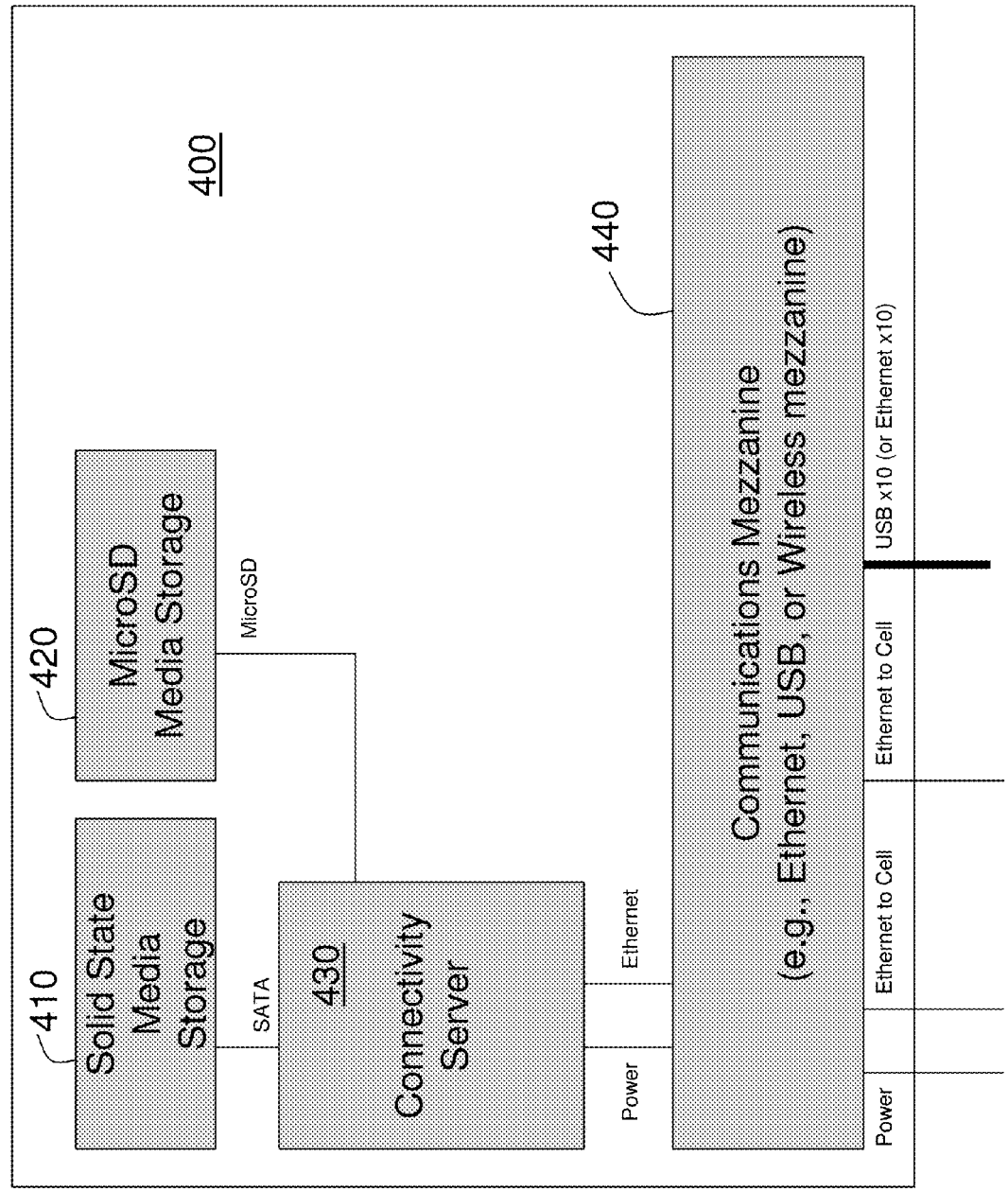
FIG. 4 illustrates an exemplary sector server that may be used to store media contents according to one embodiment of the invention.

FIG. 4 illustrates an exemplary sector server 400 that may be used to store media contents according to one embodiment of the invention. In one embodiment, the sector server 400 includes electronic components that may access media contents external to the aircraft using the media loader module 150. The aircraft may include a plurality of sector servers 400 dependent on the size of the aircraft and/or the number of seats 130. The sector server 400 may either be powered from an aircraft power bus or can have its own power supply (not shown) that provides the voltages/currents and power quality needed by the sector server 400.

Each sector server 400 comprises a storage device 410 for storing a large collection of media content such as movies, pictures, maps, games, queued internet pages, music, etc. In one embodiment, the storage device 410 may be partitioned in accordance with a number of elements. For example, and without limitation, the partitions may comprise, new (movies, music, etc.), classics (movies, music, etc.), foreign (musics, music, etc.) and the like. According to one embodiment, the storage device 410 may include a personal partition space for each seat for unique movies, music, etc.). Thus, while the majority of the media contents comprise standard movies, music, games, etc., that appeal to a majority of the users, a selection of movies, music, games, etc., are stored in the storage device that are tailored specifically to a user which the sector server 400 is servicing.

In one embodiment, the sector server 400 also includes a Secure Digital (SD) memory device 420, which stores airline/aircraft specific personalization data, for example, airline logos, specialized fonts, local menu backgrounds, airline safety presentation, etc. This data may be used to present the user with a local menu setup, which will have some standardized selections (e.g., buttons, menus, etc. . . . ).

In one embodiment, the sector server 400 may also include an input/output port, such as a USB port and the like, to receive a removable memory device such as the SD memory device. The SD memory device may contain graphic image data that may be used by a isolator/driver module 230 for displaying one or more graphic images at the SDU or the PED. The sector server 400 may further include one or more input/output (I/O) interfaces from which the sector server 400 may communicate with other sector servers, a SDU or a PED, or server/seat interface may communicate with the sector server 400 and from which the sector server 400 may communicate with the server/seat interface.

A connectivity server 430 may be a blade system including one or more blades in a blade enclosure. The one or more blade servers may be commercially available through Hewlett-Packard, IBM, Dell, Cisco, and etc. In general, the connectivity server 430 may include a microprocessor or a plurality of microprocessors that execute a sequence of instructions based on one or more inputs received by the connectivity server 430 and usually the connectivity server 430 outputs one or more results based on the executed sequence of instructions. The connectivity server 430 may further include a memory, which may be volatile, such as Dynamic Random Access Memories (DRAMs) or Static Random Access Memories (SRAMs). The connectivity server 430 connects to SD memory device 420 if the sector server 400 includes SD memory device 420, and to one or more storage devices 410 such as a hard drive and/or an optical drive all which are coupled together through a bus. In the case of the storage device 410, the connectivity server 430 may access the storage device 410 through a storage device controller such as a Serial Advanced Technology Attachment (SATA) controller. The connectivity server 430 may use the storage device 410 to store and execute instructions of an operating system or an application, and/or to store and manipulate data. The storage device 410 is used to store the operating system and applications which the connectivity server 430 may retrieve to the memory when needed, and is used to store data which among others pertains to moving maps showing progress of flight, movies, shopping, games, and information of interest to a user. While various operating systems, which may be customized or commercially available, may be used, in this embodiment, the connectivity server may use Android™ platform.

The connectivity server 430 communicates with SDUs (e.g., 200), other sector servers (e.g., 120a-h), the flight attendant panel (e.g., 140), the cockpit panel (e.g., 142), the aircraft interface module (e.g., 110), and the media loader module (e.g., 150) through a Communications Mezzanine 440, which may operate under Ethernet protocol, USB protocol, and/or Wi-Fi protocol, and the like.

Figure 5:
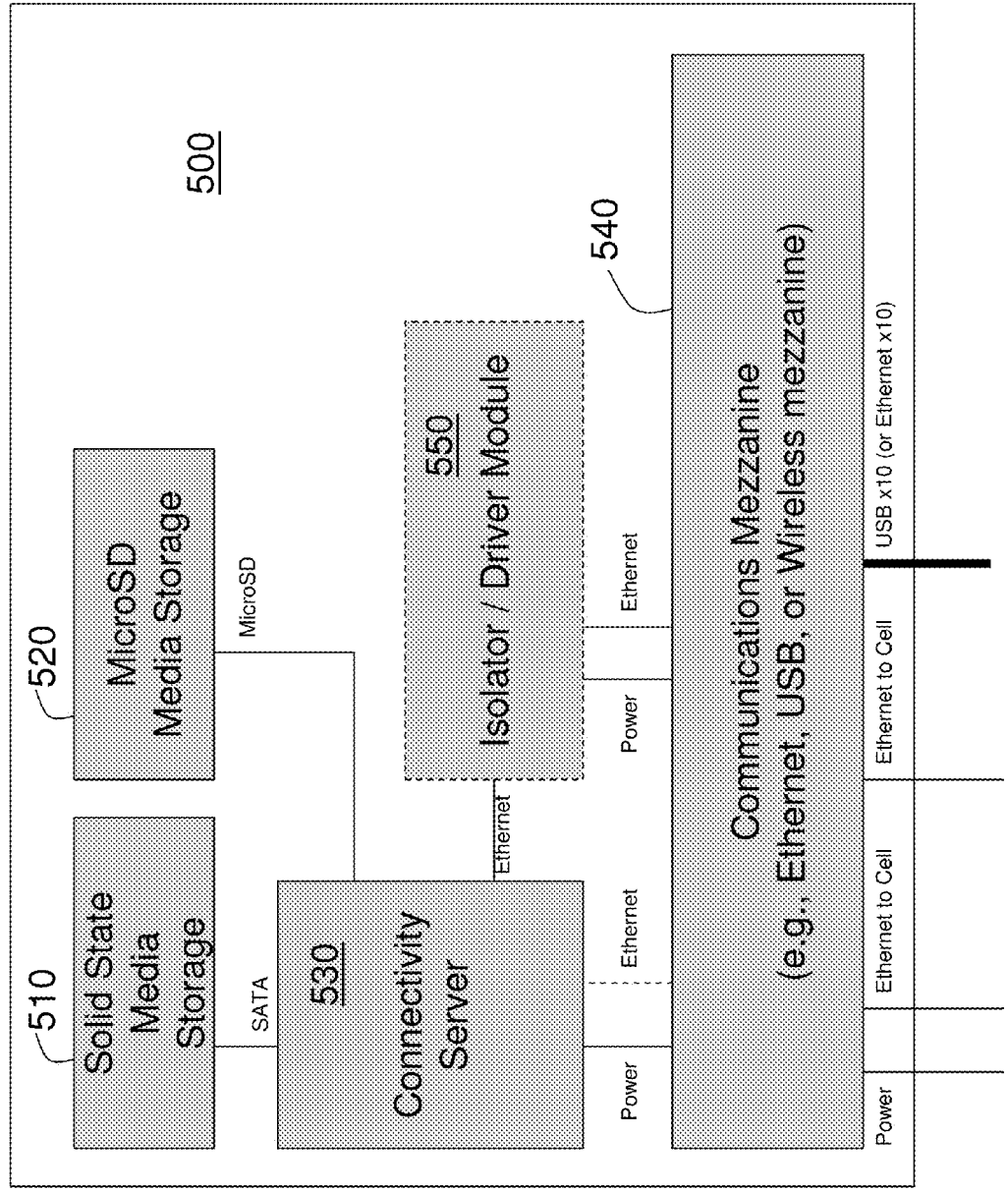
FIG. 5 illustrates an exemplary sector server configured to be used with a personal electronic device (PED) according to one embodiment of the invention.

FIG. 5 illustrates an exemplary sector server 500 configured to be used with a personal electronic device (PED) according to one embodiment of the invention. The sector server 500 comprises a storage device 510 and a connectivity server 530. The sector server 500 may further comprise a SD memory device 520. As media storage 510 and connectivity server 530 function and are connected similarly to related media storage 410 and a combination of media module 210 and connectivity server 430 respectively, they will not be further delineated here.

In one embodiment, the sector server 500 may also include an input/output port, such as a USB port and the like, to receive a removable memory device such as a Secure Digital (SD) memory device. The SD memory device may contain graphic image data that may be used by a PED for displaying one or more graphic images on the PED. The sector server 500 may further include one or more input/output (I/O) interfaces from which the sector server 500 may communicate with other sector servers, a PED, or server/seat interface may communicate with the sector server 500 and from which the sector server 500 may communicate with the server/seat interface.

In one embodiment, as shown in FIG. 5, and unlike the exemplary sector server 400 shown in FIG. 4, the connectivity server 530 does not connect to the communications mezzanine 540, but rather passes through an isolator/driver module 550 which may or may not be the same as isolator/driver module 230. For example, the isolator/driver module 550 may not require any functions to drive a display (e.g., 220). In this embodiment, the media module (PED) is placed at a downstream location of isolator/driver module 550 and thus, the data communications to the media module (PED) is also passed through the isolator/driver module 550 and can be paused, filtered, stalled, cut-off, etc., as needed. This embodiment supports the situation where the media module is actually a user supplied personal electronic device (PED) brought onto the plane and connected to the user interface of a seat, for example arm or seat back, via for example USB such that in addition to data and/or internet connectivity, power is also supplied. In this embodiment, data, such as media content, may be paused, filtered, stalled, cut-off, etc., before going to the PED and thus, the in-flight system does not need to take control of the PED.

To establish a communication with the in-flight system, the user may have to install an application in their PED. Thus, when the user connects their PED to a user interface (or otherwise connects to the sector server system), such as, for example, a USB connection, which may be located at the arm of the seat or seatback, the servicing sector server detects whether the application has been installed at the PED, and if it is not, the user may download the application for access to the media contents provided by the sector server. In the event that the user chooses not to have access to the media contents of the sector server, the user, by connecting the PED to the user interface via the USB connection, would still be able to utilize the power supply to power the PED.

Figure 6:
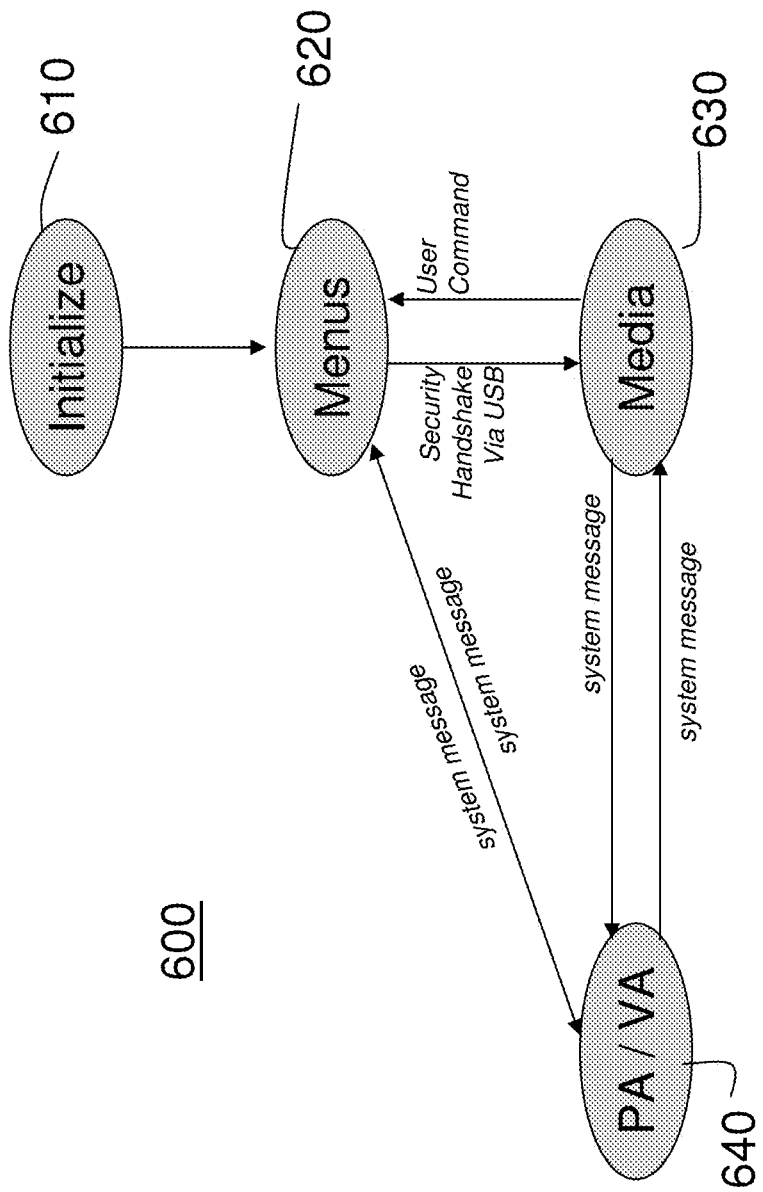
FIG. 6 illustrates an exemplary state diagram of a finite state machine implemented in the isolator/driver according to one embodiment of the invention.

FIG. 6 illustrates an exemplary state diagram of a finite state machine 600 implemented in the isolator/driver 550 according to one embodiment of the invention. Referring to FIG. 6, the isolator/driver module 550 initializes to set up and verify its functionality, state 610. Once the isolator/driver module 550 verifies that all functions are operating correctly, the state machine 600 transitions to state 620, which is the Menus state. In state 620, various media contents from the sector server 500, such as maps, movies, music, etc. are available to the user. In one embodiment, internet access (such as a web browser, email, and SMS) is available to the user through the sector server (e.g., 500/120) establishing communication with an external terrestrial source or an external satellite source (e.g., 190).

In one embodiment, when the PED connects with the sector server 500 and the installed application requests access to media contents from the sector server 500, at state 620, a security handshake may occur between the sector server and the PED in order to verify that the PED and installed application are authorized and also capable for accessing the sector server 500. Once the security handshake is completed, the finite state machine 600 may transition to state 630, which is the Media state. At state 630, the sector server 500 provides the requested media content, which may be streamed through the USB connection to the PED. Therefore, media such as games, pictures, and movies, etc. may utilize the hardware of the PED to enhance the capability of the in-flight system.

When the aircraft signals, for example, a public safety announcement, the finite state machine 600 transitions to state 640, which is PA/VA. At state 640, the sector server 500 stops, pauses, filters, or simply disconnects the flow of media content from being output to the PED. State 640 may be entered from either the state 620, Menu, or the state 630, Media. From either state 620 or state 630, state 640 is entered by a signal (e.g., keyline or system message) for a public announcement or video announcement regarding safety of the passengers. Once the system message (e.g., PA/VA signal) is cleared the finite state machine may return to its previous state 620 or state 630.

In one embodiment, in all states of the finite state machine 600, the isolator/driver module 550 is in control of the audio and video output. Therefore, in all states the isolator/driver module 550 is capable of accepting user input from the PED or a seat control unit to turn on the reading light. Thus, in this embodiment, for each state of the finite state machine, the isolator/driver module 550 is configured to generate system messages for activating the reading light. In one embodiment, every state of finite state machine 600 except the PA/VA state 640 allows the isolator/driver module 550 to generate a system message to activate the reading light.

In order to protect against intrusions (e.g., hacker, viruses, spybots, etc. . . . ) from a PED into the sector server 500 and particularly into connectivity server 530, the finite state machine also comprises a finite number of states (not shown) for handling the input request of the PED. For example, from state 620 or state 630, there may be a number of options displayed on the user PED allowing them to input to the system. For instance, from the Menus state 620, there may be a number of choices shown on the PED for, such as, displaying a map, connecting to the internet, viewing or listening to stored media, calling an attendant, or turning on a reading light. If the PED attempts to send a command or instruction that is not one of the available choices, the finite state machine of the isolation/driver module simply prompts the available option and does not forward the command or instructions to the connectivity server 530, effectively ignoring or dropping the PED command or instruction. Alternatively, choosing one of these options will cause a particular packet of data to be send from the PED to the connectivity server 530. If the sent packet is not part of a list of expected packet (e.g., that represent the actions listed above), said packets may be discarded by the connectivity server 530. This same procedure holds true in other modes of the state machine, such as Media state 630. While the delineated function calls above are not exhaustive of what may be contained within the system, they are meant to be illustrative of the feature that the sector server 500 is designed such that only authorized packets are able to flow into the server.

In addition to only allowing authorized packets to enter the sector server 500, the operating system running on the connectivity server also does not have any commonly used ports, as a person of ordinary skill in the art would understand, open. Therefore, the sector server 500 has multiple levels of security against communications from the PED affecting the status of the sector server 500 and particularly the connectivity server 530.

The SDU system described earlier may comprise this same type of intrusion protection scheme and protected operating system, if desired.

By the use of the isolator/driver module 500 in the in-flight system, the in-flight system, including the PEDs, does not require the entire in-flight system be recertified by the FAA even though the software of the PEDs are routinely upgraded, or that the PEDs have never been certified by the FAA. This is because isolator/driver module 550 may function to electrically isolate the PED and may prevent the PED from tampering with the sector server such that the PED does not interfere with the public announcements or video announcements made by an airline personnel as well as the sector server.

In one embodiment, sector server 500 does not comprise an isolator/driver module 550 and the connectivity server 530 is connected directly to the communications mezzanine 540. In this embodiment, the pausing or stopping of the of the media data to the PED is done by the connectivity server 530 of the server 500. In one embodiment, there is an FPGA wrapper around the connectivity server 530 that performs the functions of state machine 600 as described above. In yet another embodiment, there is no pausing of the media stream and the server 500 continues to supply media data even when a PA/VA occurs.

As mentioned earlier, each sector server 120/400/500 comprises a partitioned amount of space for customized media associated with the seats served by the respective sector server 120/400/500. This personal partition may be used to store particular movies, music, games, etc. that are only chosen for the seat associated with that particular partition. In one embodiment, prior to aircraft departure (i.e., taxing upon arrival or while at the gate), the manifest for the next flight is input into the in-flight system. The in-flight system may then check against a database, either stored locally or remotely, as to whether there is known preferences of passengers of the next flight. This may be done for example by requiring each user to initially set-up a login account if they desire personalized content to be available to them. In one embodiment, this type of account could be fee based. If a user has stored preferences, those preferences (GUI look, content, etc.) are loaded into the personal partition in sector server 120/400/500 storage media 410/510. The personalized or general preferences appear as specific content and information menus. The customization may be referred to as "context." That is, media, fonts, graphics, etc. can be loaded into sector server 120/400/500 as unique context, for example, per airline, or per flight, or per destination, or per user. The updating of the media in a sector server 120/400/500 may be accomplished via media loader module 150 discussed previously. In one embodiment this update occurs during the taxing of the aircraft after landing. Alternatively, in another embodiment, a hardwire or wireless network connection may service the aircraft at the gate, at which time the sector server 120/400/500 may be updated. The daisy chained sector server 120/400/500 are also able to copy among other things content from one sector server 120/400/500 to another sector server 120/400/500 utilizing the overhead/transfer partition space in the sector server 120/400/500. This feature is useful in situations where the media storage has been updated with data for a certain passenger seating arrangement, and then there are last minute changes to the seating arrangement. The sector server 120/400/500 are able to mirror the personal data from one sector server 120/400/500 to another sector server 120/400/500. In one embodiment, the general partitions (e.g., new and classics) are identical on each sector server 120/400/500 and thus do not need to be copied.

In one embodiment, the status of media usage for a user is maintained in the personal partition associated with the user and then saved into the account information, such that if the user is making a connection flight they can continue the media application in another aircraft with the same system, where they left off. This is also part of the maintained "context" or even better described as the "persistent context." In one embodiment, the status of media viewing is saved on the user PED and later communicate to a sector server on a subsequent flight. In one embodiment, a master account database saves the user media selection(s) and the status of media viewing, and the master database is accessible via the internet (e.g., on their PED). In yet another embodiment, sector server(s) store information on the airports that are serviced by the particular airline having the present in-flight system installed. The system may offer a push of data comprising the arrival airport information for any user that has their PED connected to the system. This data may comprise information on food and other services in the airport, connecting gate information, and support a guidance application to navigate the user through the airport.

Figure 7:
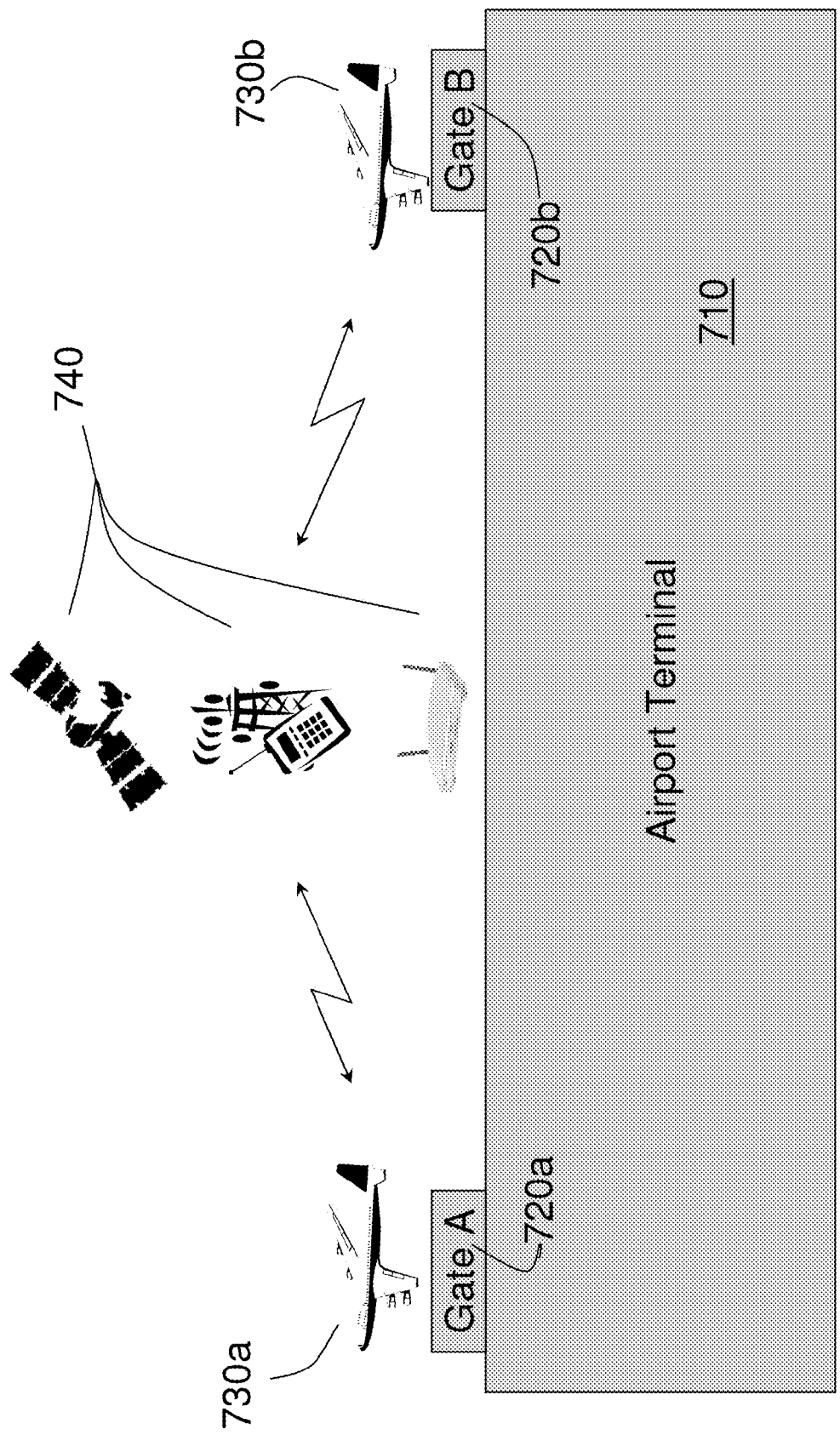
FIG. 7 illustrates an exemplarily flight/data transition according to one embodiment of the invention.

FIG. 7 illustrates an exemplarily flight/data transition according to one embodiment of the invention. As mentioned earlier, aircraft (e.g., 730a) taxing after arrival and before arriving at the gate (here Gate A, 720a) might connect via a number of communications means 740 (e.g., satellite, cellular, or wireless) and update a terrestrial database with information such as personal media status, personal or alternatively per seat usage information. Arriving aircraft 730a may also download (i.e., update) there media storage content via the communications means 740. In one embodiment, this update includes a download of the passenger list for the next flight on aircraft 730a. This information, as discussed previously, may be utilized by the present in-flight system to reconfigure the sector servers with media content for the next flight's passengers. Likewise, before and/or during the time when aircraft 730a is uploading/downloading relevant information from the in-flight system's terrestrial storage facility, aircraft 730b, which may be at Gate B 720b or may also be taxing to Gate B 720b, is performing the same operations, such that its sector servers are reconfigured with media content for the next flight's passengers.

Figure 8:
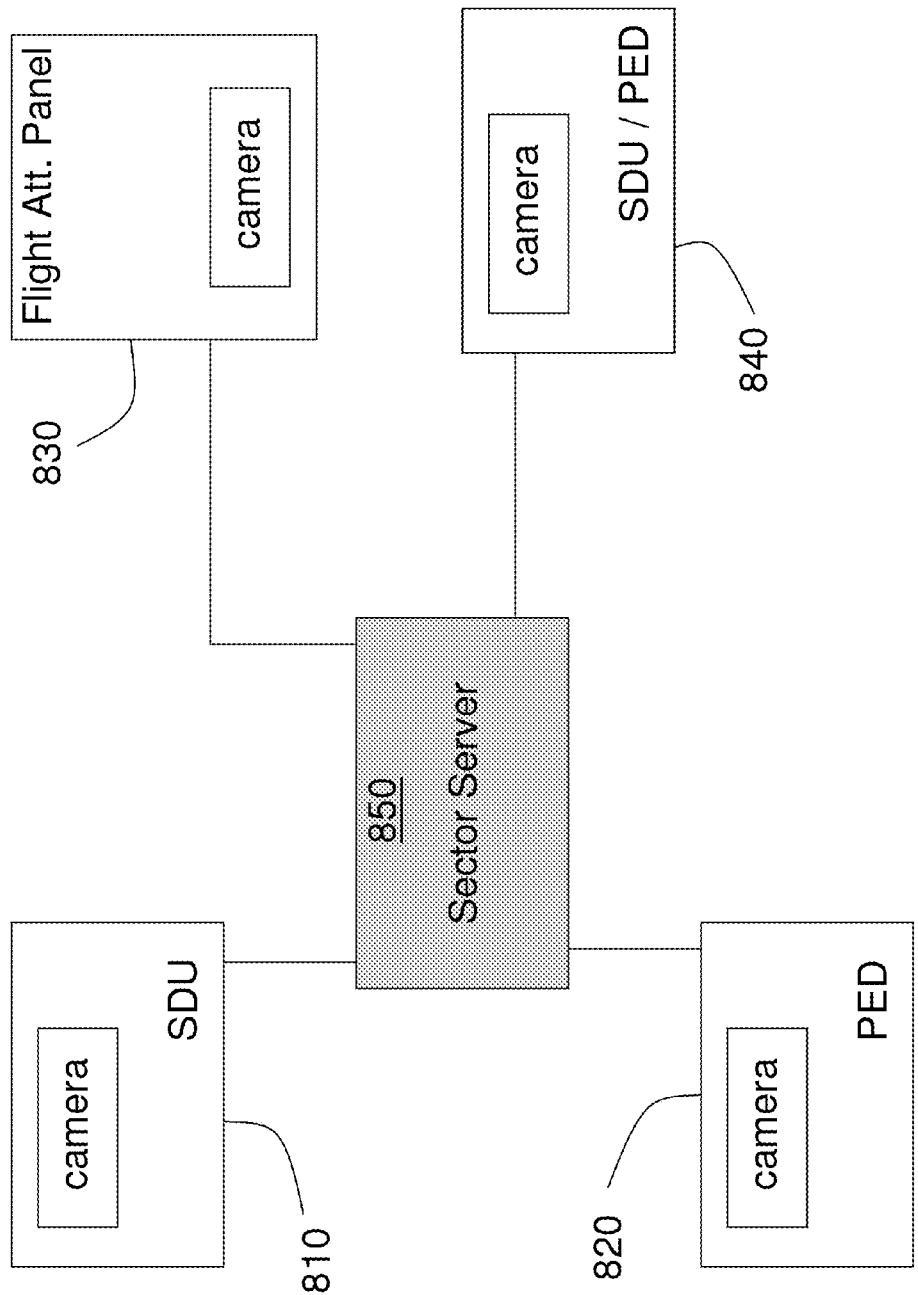
FIG. 8 illustrates another exemplary in-flight system according to one embodiment of the invention.

FIG. 8 illustrates another exemplary in-flight system according to one embodiment of the invention. In at least one embodiment, an SDU 810 (discussed previously herein) also comprises a camera. In one embodiment, a camera may be located on a PED 820. The camera may be utilized in a number of ways comprising, but not limited to, video chat and security profiling. In one embodiment, the camera could be used for facial recognition, including but not limited to expression detection and alerting airline personnel. In either of these embodiments the SDU 810 or the PED 820 communicates the images (still or video) through a sector server 850 to either the flight attendant panel 830 (which may also comprise a camera) or to another SDU/PED 840. In the embodiment comprising video chat, the system might also be used as a flight attendant call (discussed previously herein) where the flight attendant is able to communicate with the seat 130 without actually walking to the physical location. This could increase efficiency and provide for quicker resolution to attendant calls. Likewise, this embodiment may be used to profile suspicious behavior and/or identify individuals not complying with aircraft crew member instructions. In one embodiment, this system would allow for seat to seat video communications, which would be an added feature particularly for those situations when passengers are traveling together but have not been seated together. In the security embodiment, the camera located in either the SDU 810 or PED 820 could be used as another verification of a person's facial characteristics against a known database of facial characteristics (e.g., FBI, CIA, local police, Interpol, plurality of DMV records, INS, CBP, etc. . . . ) for a variety of purposes. Because this feature must navigate through the sector servers, it too can be isolated from the system in case of a PA/VA.

In one embodiment, the camera located, for example, in SDU 810 or PED 820 is used to recognize hand and/or facial gestures to manipulate the user input, as discussed above. For example, while watching a movie a user may swipe their hand right-to-left to rewind a certain amount or left-to-right to skip forward a certain amount. There are a plurality of additional hand gesture gestures that might be used, and a plurality of input actions that can be associated with said hand gestures. In one embodiment, the user might personalize the association of hand gestures to input actions. This personalization may be saved (and then uploaded or downloaded) in the personal partition area of a sector server mentioned earlier.

Although various embodiments of the invention have been described, one of ordinary skill in the art will readily recognize that there could be variations to the embodiments and those variations would be within the spirit and scope of the present invention. Accordingly, many modifications may be made by one of ordinary skill in there are without departing from the spirit and scope of the appended claims.

We claim:

1. A system, comprising:
   at least one communications port;
   a plurality of sector servers connected to each other in a distributed manner and configured to mirror data amongst each of the servers,
   wherein each sector server further comprises:
      an isolator/driver module, coupled to and in communication with the at least one communications port,
      wherein the isolator/driver module is a finite state machine, and
      wherein the isolator/driver module electrically isolates the at least one communications port from the sector server; and
   a communications connection from the at least one communications port to one of the plurality of sector servers for sending and receiving data communication when a personal electronic device (PED) is connected to the at least one communications port,
   wherein the one sector server is configured to provide media stored in the one sector server or media external to the one sector server through the communications connection, and power is supplied to the PED or a battery of the PED is charged regardless of whether any data communication is sent or received.

2. The system of claim 1, wherein the at least one communications port comprises a USB connector, mini-USB connector, or micro-USB connector.

3. The system of claim 2, wherein the at least one of a USB connector, mini-USB connector, or micro-USB connector, comprises an electrical connection to supply power to the PED or the battery of the PED.

4. The system of claim 1, wherein the at least one communications port is provided as part of a seat.

5. The system of claim 4, wherein the at least one communications port is located in an arm of the seat.

6. The system of claim 1, wherein the data communication comprises one or more of the following types of media content:
   a) terrestrial based internet;
   b) locally stored music;
   c) locally stored movies/tv;
   d) locally stored games;
   e) locally stored map;
   f) satellite radio; and
   g) satellite tv.

7. The system of claim 1, wherein the PED requires an application (i.e., app) be loaded onto the PED to access and/or receive media stored in or accessed externally by the sector server.

8. The system of claim 7, wherein the app for accessing and/or receiving media stored in or accessed externally by the sector server is made available to the PED when the PED is connected to the at least one communications port.

9. A system, comprising:
   a plurality of sector servers connected to each other in a distributed manner and configured to mirror data amongst each of the servers;
   a plurality of passenger seats each including a display;
   an isolator/driver module located at each passenger seat, the isolator/driver module being coupled to and in communication with one of the plurality of sector servers; and
   a media module located at each passenger seat for processing media supplied from the one sector server and driving the display to show the processed media,
   wherein the isolator/driver module is a finite state machine, and
   wherein the isolator/driver module electrically isolates the media module from the plurality of sector servers.

10. The system of claim 9, further comprising:
    a user input module.

11. The system of claim 10, wherein the user input module comprises a touchscreen which also function as the display.

12. The system of claim 9, further comprising:
    an audio output.

13. The system of claim 9, wherein the isolator/driver module, the media module, and the display are each contained within a seat display unit (SDU), which is located in a seat back.

14. The system of claim 9, wherein the SDU further comprises:
    a camera.

15. The system of claim 14, wherein the camera is used to recognize and confirm passenger facial features and communicate the facial recognition information to the sector server.

16. The system of claim 14, wherein the camera can recognize passenger hand gestures to manipulate input commands to the user input module.

17. The system of claim 14, wherein the camera can recognize passenger facial gestures to manipulate input commands to the user input module.

18. The system of claim 9, wherein the isolator/driver module drives the audio and video output to the display.

19. The system of claim 9, wherein the media module comprises an Android™ platform.

20. The system of claim 9, further comprising:
    at least one communications port; and
    a communications connection from the at least one communications port to the sector server for sending and receiving data communication when a personal electronic device (PED) is connected to the at least one communications port,
    wherein the sector server is configured to provide media stored in the sector server or media external to the sector server through the communications connection, and power is supplied to the PED or a battery of the PED is charged regardless of whether any data communication is sent or received.

21. The system of claim 20, wherein the at least one communications port comprises a USB connector, mini-USB connector, or micro-USB connector.

22. The system of claim 21, wherein the at least one of a USB connector, mini-USB connector, or micro-USB connector, comprises an electrical connection to supply power to the PED or the battery of the PED.

* * * * *